J. W. HENWOOD.
OPTICAL PROJECTION APPARATUS.
APPLICATION FILED APR. 26, 1910.
975,949.
Patented Nov. 15, 1910.
4 SHEETS—SHEET 3.
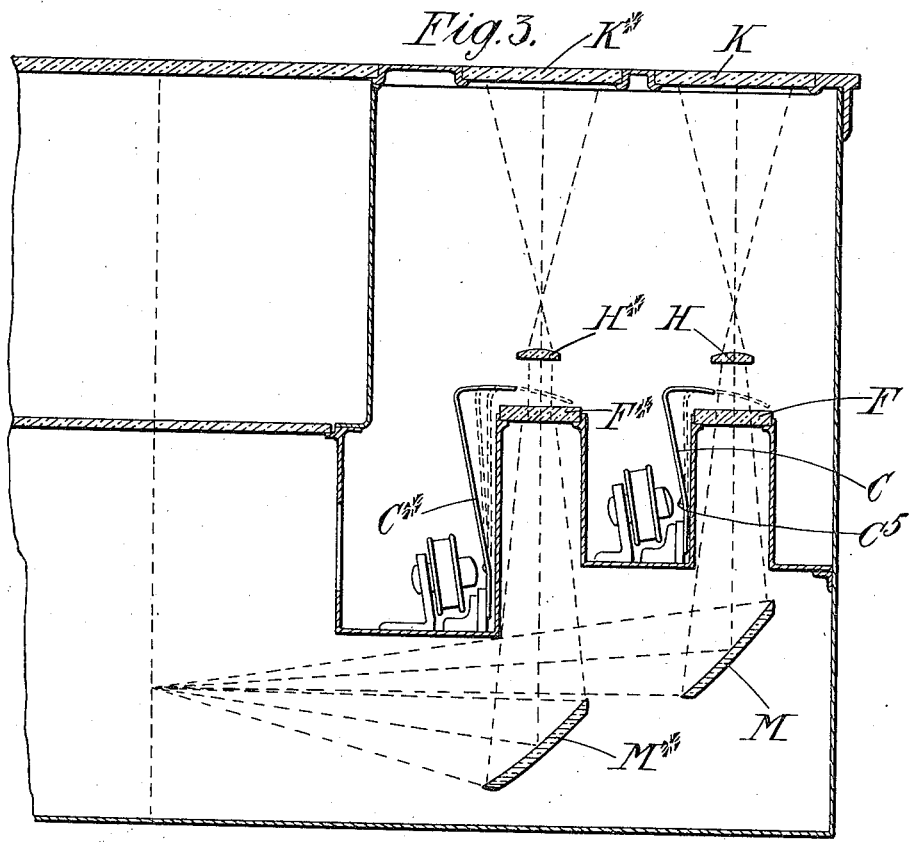
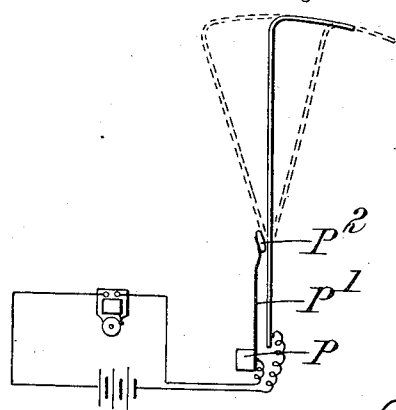
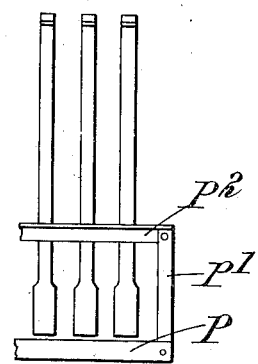

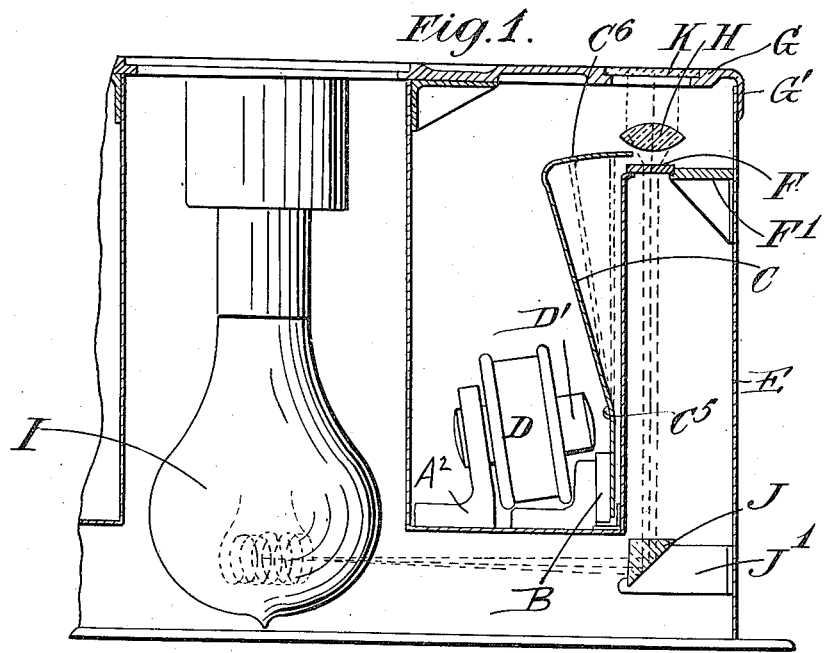

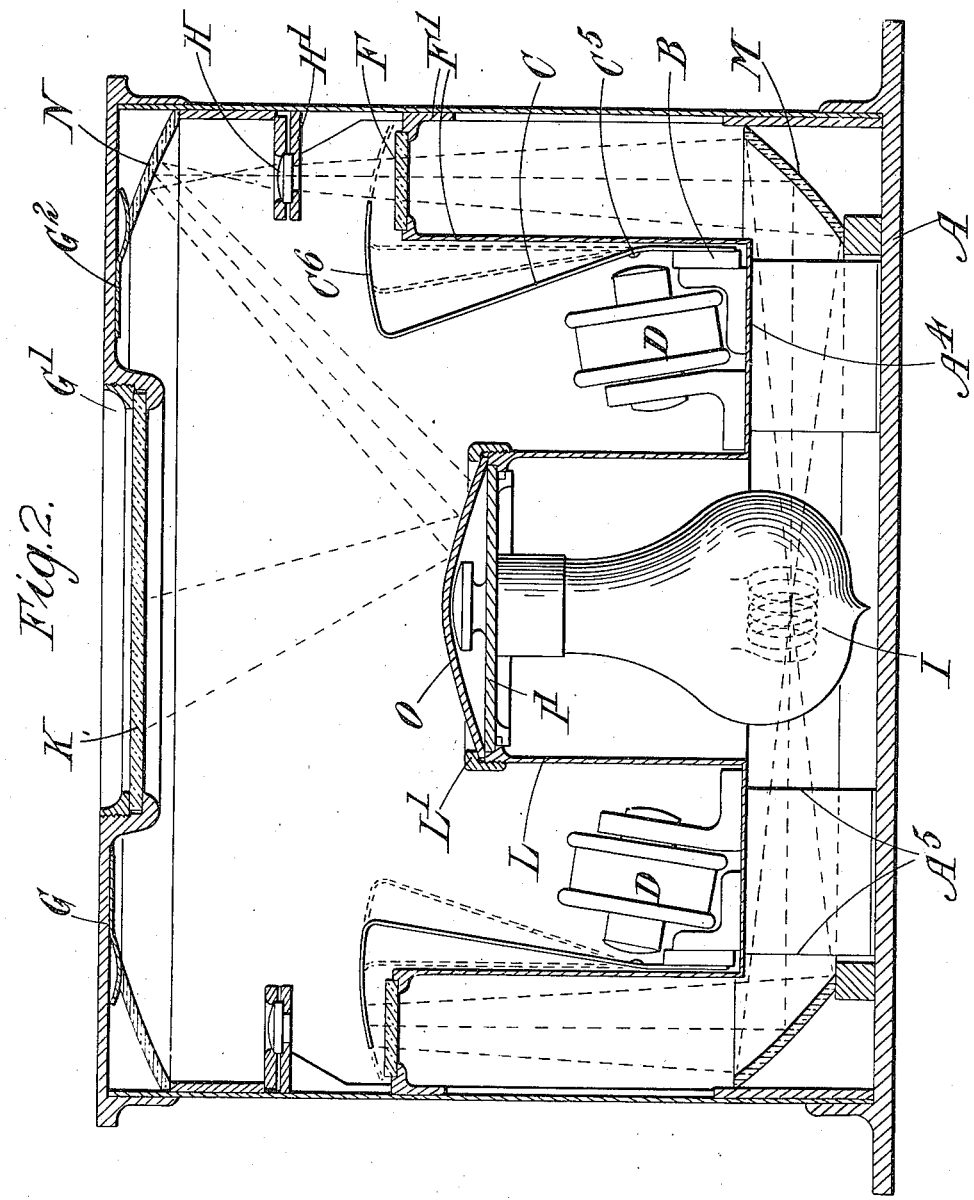

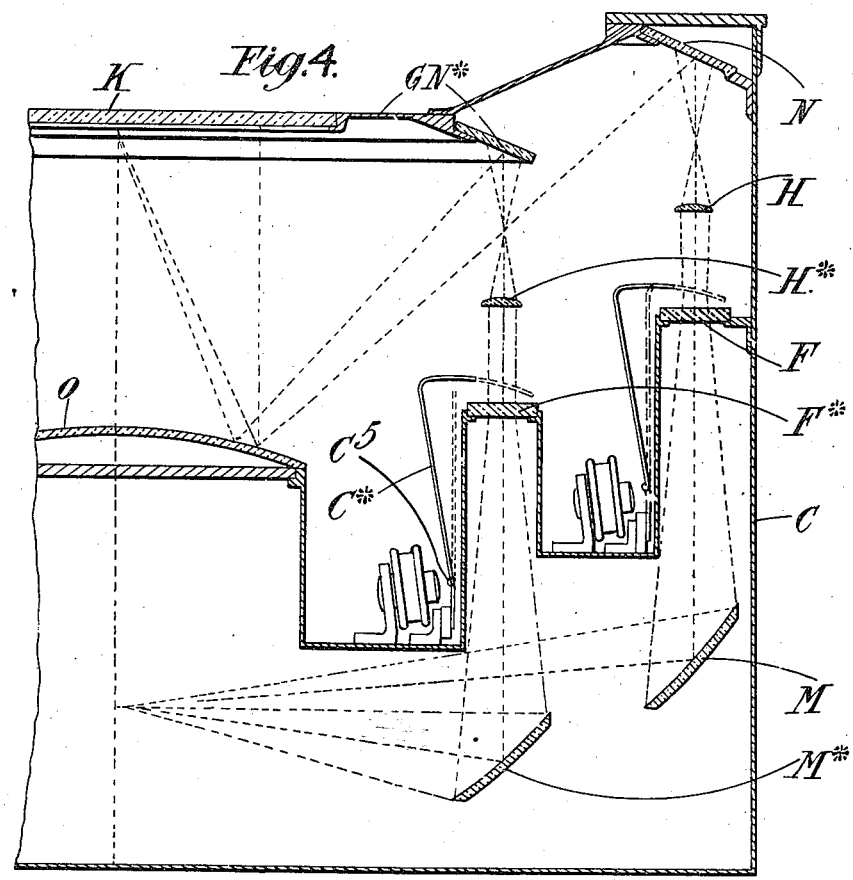
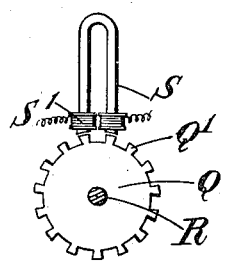

UNITED STATES PATENT OFFICE.

JOHN WILLIAM HENWOOD, OF LONDON, ENGLAND.

OPTICAL PROJECTION APPARATUS.

975,949.  Specification of Letters Patent.  Patented Nov. 15, 1910.

Application filed April 26, 1910. Serial No. 557,713.

*To all whom it may concern:*

Be it known that I, JOHN WILLIAM HENWOOD, a subject of the King of England, residing at London, England, have invented certain new and useful Improvements in Optical Projection Apparatus, of which the following is a specification.

The present invention relates to optical projection apparatus adapted to enable indications to be more readily visible to an observer who may be at a distance from any instrument embodying this invention.

This invention relates more particularly to optical projection apparatus for showing at any moment the speed of a motor or other vehicle or the speed of rotation of engines or shafting but is not limited in its application in this respect.

The present invention consists of an optical projection apparatus having in combination a source of light, a screen with a face presented away from said source, a light projector which is directed toward said face and is situated in the path of rays derived from said source, an optical magnifying device and light flexing devices disposed in the path of the rays proceeding from said source to said light projector.

I will describe my invention in combination with an electro-magnetic speed indicator of the type described in British Patent No. 11817/1895 issued to Albert Campbell.

The invention will be more readily understood from the following description taken in conjunction with the accompanying drawings which illustrate several constructions of apparatus embodying the features of this invention.

Figure 1 is a vertical sectional view, partly in elevation, of an apparatus embodying my invention. Fig. 2 is a similar view of a modified construction. Fig. 3 is a similar view of a further modification. Fig. 4 is a similar view of still another modification. Figs. 5 and 6 are detail views illustrating an alarm device and Fig. 7 is a detail view illustrating an inductor.

Like letters indicate like parts throughout the drawings.

C indicate vibratile fingers, which in practice are arranged in the form of groups. These fingers are each fixed at one end to the ring B and placed side by side so as to stand up in the circumference of a circle, in such a manner that although their lengths vary considerably, their upper or free ends are all at the same level. The top ends are made thin and broader than the other portions of the fingers which are individually of the same width and thickness throughout each group, except where fixed to the ring B.

The fingers may be arranged in any number of groups and any one group may comprise any number of fingers those in each group being of the same thickness, except those for the lowest speeds which may be made thinner as necessary. This arrangement greatly increases the range and utility of the instrument.

Secured to the base A are supports $A^2$ to which are attached the electromagnets D of which any convenient number may be used. The coils of these electromagnets may be connected in series or parallel. The pole faces D' are of arcuate form of such radius that each is approximately concentric with the fingers. Each finger is provided with a small projection $C^5$ opposite the pole piece D' to strengthen and concentrate the pull of the electromagnet. A casing E fits on to the base A. This casing surrounds the working parts of the speed indicator to protect them from damage and prevent the entry of dust.

A scale F which, in practice, would be circular and having a series of numbers on it is supported by brackets F'. The fingers are provided with ends which are hook-shaped or bent at right angles to the length of the fingers, such finger ends or bent portions being given a curve which corresponds to the arc of vibration. These ends are arranged to overlap the numbers on the scale F when the fingers are stationary or vibrate but slightly; but when any one finger vibrates considerably its end moves clear of a number thus indicating clearly the speed of the moving part whose revolutions or reciprocations it is desired to note. A cover G is provided with a flange G' which fits over the casing E. In the center of the instrument an electric incandescent lamp I is placed so that its divergent rays are picked up by an annular glass reflector J, carried by brackets J' and employed to divert out of the principal axis of the apparatus passing through the source of light the beam employed to project the individual number, the axis of which beam then becomes perpendicular to the translucent scale F, which is supported by brackets F'. The hook-shaped ends $C^6$ of the fingers C are situated, when stationary, immediately above this scale and above the finger ends a number of lenses H are disposed, so as to project an enlarged image of the number disclosed by a vibrating finger, on to the ring-shaped ground glass screen K.

Fig. 2 illustrates a preferred form of optical projection apparatus, also provided with a single projection-apparatus and a screen by means of which the indications of the instrument may be magnified and made visible at a distance. The arrangement of the vibratile fingers and electro-magnets is similar to that described in connection with Fig. 1, except that they are not mounted on the base A of the instrument but on a small platform $A^4$ supported at intervals by uprights $A^5$. An electric lamp I attached to a base I' is arranged within a casing L so that its divergent rays are caught by an annular concave reflector M and reflected upward on to and through a translucent scale F supported by brackets F'. The hook-shaped ends of the fingers overlap this scale and above them a series of lenses H, carried in brackets H', are placed. At an angle to and above the lenses an annular concave reflector N is situated. In the center of the instrument, mounted on the casing L, is a magnifying reflector O the reflecting surface of which is according to this invention presented away from instead of toward the source of light, i. e. the lamp I, and directly above this reflector in the center of the cover G, a ground glass screen K is placed and is held in position by means of the screwed ring G'. The reflector O is in the form of a convex plate. The reflector N is held tightly in position by means of a number of springs $G^2$ which are attached to the cover G and which press on the reflector when the cover is put on. A threaded ring L' holds both the reflector O and lamp base I' in position when it is screwed on to the casing L.

Figs. 3 and 4 illustrate types of optical projection apparatus for indicating between very wide ranges of speed, each of which is provided with a multiple projection-apparatus and a screen. In Fig. 3 two rows of vibratile fingers C C* are shown with the electro-magnets for operating them. A source of light is provided located so that the rays are reflected on to both of two annular concave reflectors M M*. From these reflectors rays are reflected through the translucent scales F F*, and above these scales two rows of lenses H H* are placed to project the number disclosed by the vibrating finger on to the ground glass screens K K*. Fig. 4 is somewhat like Fig. 3 but is provided with two annular concave reflectors N N* arranged so that the number projected on to both of them from both of the translucent scales H H* is projected on to the convex reflector O in the center of the instrument and from there reflected magnified to the ground glass screen K placed in the center of the cover G above the reflector O.

Figs. 5 and 6 show an alarm device whereby a signal may be given when and during the time that a certain speed is being exceeded. This device consists of a metal piece P concentric with the fingers. To each end of this metal piece is attached, but insulated therefrom, a flexible strip of metal P'. Across the top of these strips is placed a strip of metal $P^2$ so disposed that when a selected finger or one out of a selected group of fingers is vibrated, contact is made with the bar $P^2$ and the circuit for ringing the electric bell is completed.

Fig. 7 illustrates an inductor Q carried by the shaft R whose revolutions are to be counted. This inductor is provided with a number of projections Q' and is rotated close to the end of the permanent magnet S. The coils S' of the magnet are joined in series or parallel with the coils of the magnets D of the speed indicator and the magnetic impulses produced in the coils S' by the projections on the inductor as it rotates close to the ends of the permanent magnet S, cause similar impulses in the magnets D with the result that the finger whose natural vibration period corresponds to the number of magnetic impulses received from the inductor, will vibrate and disclose the number corresponding to the speed of the moving part.

The number of teeth on the inductor and its speed of rotation are arranged to correspond to or to be proportional to the speed of the part whose velocity is to be indicated and to the number of vibrations required for the finger allotted to that particular speed.

What I claim as my invention and desire to secure by Letters Patent is:—

1. In an apparatus of the character described, the combination with a scale plate having differing indices thereon, and means for covering and uncovering said indices, of a source of light, a receiving surface, and means arranged to cause rays of light from said source to pass through the scale plate and project the indices as they are uncovered upon said receiving surface.

2. In an apparatus of the character described, the combination with a scale plate having differing indices thereon, and means for covering and uncovering said indices, of a source of light, a receiving surface, and means to cause rays of light from said source to pass through the scale plate and project an enlarged image of each indication as it is uncovered upon said receiving surface.

3. In an apparatus of the character described, the combination with a scale plate having differing indices arranged circularly thereon, and means for covering and uncovering said indices, of a source of light arranged centrally with respect to the said indices, a receiving surface, and means for causing rays of light from said source to pass through the scale plate and project the indices as they are uncovered upon said receiving plate.

4. In an apparatus of the character described, the combination with a scale plate having differing indices thereon, and means for covering and uncovering said indices, of a source of light, a receiving surface, and reflecting and refracting bodies arranged to intercept divergent rays from said source and cause them to pass through the scale plate and project the indices as they are uncovered upon said receiving surface.

5. In an apparatus of the character described, the combination with a scale plate having differing indices arranged circularly thereon, and means for covering and uncovering said indices, of a source of light arranged centrally with respect to said indices, a receiving surface, and circular reflecting and refracting bodies arranged around the source of light in position to intercept rays of light therefrom and cause them to pass through the scale plate and project the indices as they are uncovered upon said receiving surface, enlarged as set forth.

6. In optical projection-apparatus, the combination of a source of light, a reflector having its reflecting face presented away from said source, a light-flexing device which encircles an axis passing through the source and is presented toward said source, a second light-flexing device which is presented toward the first and toward the aforesaid reflector, optical ray-diverging devices situated in the path of the rays derived from said source, optical ray-converging devices also situated in the path of the said rays, and a translucent image-receiving screen presented toward the aforesaid reflector, and a scale plate having differing indices thereon and through which scale plate pass the rays of light from the first-mentioned light-flexing device.

7. In optical projection apparatus, the combination of a source of light, a reflector having its reflecting face presented away from said source, a light-flexing device which encircles an axis passing through the source and is presented toward said source, a second light-flexing device which is presented toward the first and toward the aforesaid reflector, optical ray-diverging devices situated in the path of the rays derived from said source and optical ray-converging devices also situated in the path of the said rays, a scale plate having differing indices thereon and through which scale plate pass the rays of light from the first-mentioned light-flexing device, and an image-receiving screen to receive the image reflected from the aforesaid reflector.

8. In optical projection apparatus, the combination of a source of light, a reflector having its reflecting face presented away from said source, a light-flexing device which encircles an axis passing through the source and is presented toward said source, a second light-flexing device which is presented toward the first and toward the aforesaid reflector, and optical ray-diverging devices situated in the path of the rays derived from said source, a scale plate having differing indices thereon and through which scale plate pass the rays of light from the first-mentioned light-flexing device, and an image-receiving screen to receive the image reflected from the aforesaid reflector.

9. In optical projection apparatus the combination of a source of light, a reflector with its reflecting face presented away from said source, a light-flexing device which encircles an axis passing through the source and is presented toward said source and a second light-flexing device which is presented toward the first and toward the screen, a scale plate having differing indices thereon and through which scale plate pass the rays of light from the first-mentioned light-flexing device, and an image-receiving screen to receive the image reflected from the aforesaid reflector.

In testimony whereof I have signed my name to this specification in the presence of two subscribing witnesses.

JOHN WILLIAM HENWOOD.

Witnesses:
WILLIAM JOHN TENNANT,
HARRY B. BRIDGE.